US011108679B2

(12) United States Patent
Ronen et al.

(10) Patent No.: US 11,108,679 B2
(45) Date of Patent: *Aug. 31, 2021

(54) PRODUCING DEADLOCK-FREE ROUTES IN LOSSLESS CARTESIAN TOPOLOGIES WITH MINIMAL NUMBER OF VIRTUAL LANES

(71) Applicant: MELLANOX TECHNOLOGIES TLV LTD., Raanana (IL)

(72) Inventors: Tamir Ronen, Lehavim (IL); Yuval Shpigelman, Netanya (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 119 days.

This patent is subject to a terminal disclaimer.

(21) Appl. No.: 16/535,100

(22) Filed: Aug. 8, 2019

(65) Prior Publication Data

US 2021/0044513 A1 Feb. 11, 2021

(51) Int. Cl.
*H04L 12/733* (2013.01)
*G06F 13/40* (2006.01)
(Continued)

(52) U.S. Cl.
CPC ........ *H04L 45/122* (2013.01); *G06F 13/4036* (2013.01); *H04L 45/02* (2013.01);
(Continued)

(58) Field of Classification Search
CPC ....... H04L 45/18; H04L 45/02; H04L 45/122; H04L 12/56; H04L 45/00; H04L 45/04;
(Continued)

(56) References Cited

U.S. PATENT DOCUMENTS 5,533,198 A 7/1996 Thorson
6,031,835 A * 2/2000 Abali ................ H04Q 11/0414
370/388
(Continued)

FOREIGN PATENT DOCUMENTS

EP 2662778 A1 11/2013

OTHER PUBLICATIONS

Seitz et al., "The architecture and programming of the Ametek series 2010 multicomputer", C3P Proceedings of the 3rd Conference on Hypercube concurrent computers and applications: Architecture, software, computer systems, and general issues, vol. 1, pp. 33-36, Pasadena, USA, Jan. 19-20, 1988.
(Continued)

*Primary Examiner* — Ninos Donabed
(74) *Attorney, Agent, or Firm* — Kligler & Associates Patent Attorneys Ltd

(57) ABSTRACT

An apparatus includes a network interface and a processor. The network interface communicates with a network including switches interconnected in a Cartesian topology having multiple dimensions. The processor predefines turn types of turns in the Cartesian topology, each turn traverses first and second hops along first and second dimensions having same or different respective identities, and each turn type is defined at least by identities of the first and second dimensions. The processor searches for a preferred route from a source switch to a destination switch, by evaluating candidate routes based on the number of VLs required for preventing a deadlock condition caused by the candidate route. The number of VLs required depends on a sequential pattern of turn types formed by the candidate route. The processor configures one or more switches in the network to route packets from the source switch to the destination switch along the preferred route.

18 Claims, 3 Drawing Sheets

(51) Int. Cl.
  *H04L 12/751* (2013.01)
  *H04L 12/707* (2013.01)
  *H04L 12/721* (2013.01)
  *H04L 12/713* (2013.01)
(52) U.S. Cl.
  CPC .............. *H04L 45/22* (2013.01); *H04L 45/38* (2013.01); *H04L 45/586* (2013.01)
(58) Field of Classification Search
  CPC ......... H04L 45/06; H04L 45/22; H04L 45/24; H04L 45/28; H04L 45/302; H04L 45/48; H04L 59/25; H04L 13/4036; H04L 45/38; H04L 45/586
  See application file for complete search history.

(56) References Cited

U.S. PATENT DOCUMENTS

| | | | |
|---|---|---|---|
| 6,859,435 B1* | 2/2005 | Lee | H04L 47/10 370/231 |
| 6,918,063 B2 | 7/2005 | Ho et al. | |
| 7,620,736 B2 | 11/2009 | Westfall | |
| 8,391,282 B1 | 3/2013 | Lu et al. | |
| 9,009,648 B2 | 4/2015 | Kumar et al. | |
| 10,404,574 B2 | 9/2019 | Zdornov et al. | |
| 2002/0029287 A1 | 3/2002 | Yemini et al. | |
| 2003/0043756 A1* | 3/2003 | Reynders | H04L 45/12 370/254 |
| 2008/0285458 A1* | 11/2008 | Lysne | H04L 45/00 370/238 |
| 2009/0046727 A1* | 2/2009 | Towles | H04L 45/302 370/397 |
| 2013/0114620 A1* | 5/2013 | Bogdanski | H04L 49/15 370/408 |
| 2013/0124910 A1* | 5/2013 | Guay | G06F 11/1482 714/4.1 |
| 2013/0308444 A1* | 11/2013 | Sem-Jacobsen | H04L 45/02 370/230 |
| 2013/0311697 A1* | 11/2013 | Abel | H04L 49/101 710/317 |
| 2014/0044015 A1* | 2/2014 | Chen | H04L 41/0663 370/255 |
| 2014/0064287 A1* | 3/2014 | Bogdanski | H04L 49/15 370/400 |
| 2014/0146666 A1* | 5/2014 | Kwan | H04L 47/12 370/230 |
| 2014/0204738 A1* | 7/2014 | Carter | H04L 47/122 370/230 |
| 2015/0030034 A1* | 1/2015 | Bogdanski | H04L 45/24 370/401 |
| 2015/0249590 A1* | 9/2015 | Gusat | H04L 45/48 370/392 |
| 2016/0012004 A1* | 1/2016 | Arimilli | G06F 13/4027 710/306 |
| 2016/0323127 A1* | 11/2016 | Pande | H04B 1/40 |
| 2018/0145881 A1 | 5/2018 | Zdornov et al. | |
| 2018/0145900 A1* | 5/2018 | Zdornov | H04L 49/25 |
| 2019/0007300 A1 | 1/2019 | Karanam et al. | |
| 2019/0058651 A1 | 2/2019 | McDonald | |

OTHER PUBLICATIONS

Dally et al., "Deadlock-free message routing in multiprocessor interconnection networks", IEEE Transactions on Computers, vol. C-36, issue 5, pp. 547-553, May 1987.
Glass et al., "The turn model for adaptive routing", Proceedings of the 19th annual international symposium on Computer architecture (ISCA '92), pp. 278-287, Queensland, Australia, May 19-21, 1992.
Underwood et al., "A unified algorithm for both randomized deterministic and adaptive routing in tows networks", IEEE International Symposium on Parallel and Distributed Processing Workshops and Phd Forum (IPDPSW), pp. 723-732, May 16-20, 2011.
Sancho et al., "Analyzing the Influence of Virtual Lanes on the Performance of InfiniBand Networks", Proceedings of the International Parallel and Distributed Processing Symposium, pp. 1-10, year 2002.
Shim et al., "Static Virtual Channel Allocation in Oblivious Routing", 3rd ACM/IEEE International Symposium on Networks-on-Chip, pp. 1-6, May 10-13, 2009.
Domke et al., "Deadlock-Free Oblivious Routing for Arbitrary Topologies", Proceedings of the 2011 IEEE International Parallel & Distributed Processing Symposium (IPDPS '11), pp. 616-627, May 16-20, 2011.
Upadhyay et al., "Routing Algorithms for Torus Networks", International Conference on High Performance Computing, New Delhi, India, pp. 1-6, Dec. 27-30, 1995.
Scheideler, C., "Basic routing theory I—Oblivious routing", The Johns Hopkins University, Theory of Network Communication, Lecture 3, pp. 1-8, Sep. 23-25, 2002.
Singh et al., "Locality-Preserving Randomized Oblivious Routing on Torus Networks", Proceedings of the 14th Annual ACM Symposium on Parallel Algorithms and Architectures, pp. 9-13, Aug. 10-13, 2002.
Dally et al., "Deadlock-free adaptive routing in multicomputer networks using virtual channels", IEEE Transactions on Parallel and Distributed Systems, vol. 4, Issue 4, pp. 466-475, Apr. 1, 1993.
U.S. Appl. No. 15/814,430 office action dated Apr. 6, 2020.
EP Application # 20189951 Search Report dated Dec. 3, 2020.
Ahn et al., "HyperX: Topology, routing, and packaging of efficient large-scale networks", Proceedings of the Conference on High Performance Computing Networking, Storage and Analysis, pp. 1-11, Nov. 14-20, 2009.
Verma, "Mesh interconnection network definition, advantages, disadvantages", Engineers Portal, pp. 1-4, Feb. 28, 2016.
InfiniBand Architecture Specification, vol. 1, Release 1.2.1, pp. 1-1727, Nov. 2007.

\* cited by examiner

PRODUCING DEADLOCK-FREE ROUTES IN LOSSLESS CARTESIAN TOPOLOGIES WITH MINIMAL NUMBER OF VIRTUAL LANES

TECHNICAL FIELD

Embodiments described herein relate generally to network communication, and particularly to methods and systems for deadlock-free routing in lossless Cartesian topology networks.

BACKGROUND

A communication network typically comprises multiple network elements such as switches or routers interconnected with one another. The switches typically buffer incoming packets before sending the packets to a selected next-hop switch, and employ flow control measures to prevent previous-hop switches from causing buffer overflow. A deadlock condition may occur in the network, when the buffers of multiple switches having cyclic dependency become full. Deadlock conditions are likely to occur in certain network topologies such as mesh, torus and hypercube topologies.

Methods for packet routing that avoid deadlock conditions are known in the art. For example, U.S. Patent Application Publication 2018/0145900, describes an apparatus that includes a network interface and a processor. The network interface is configured to communicate with a network that includes a plurality of switches interconnected in a Cartesian topology having multiple dimensions. The processor is configured to predefine an order among the dimensions of the Cartesian topology, to search for a preferred route via the network from a source switch to a destination switch, by evaluating candidate routes based at least on respective numbers of switches along the candidate routes for which traversal to a next-hop switch changes from one of the dimensions to another of the dimensions opposite to the predefined order, and to configure one or more of the switches in the network to route packets from the source switch to the destination switch along the preferred route.

One routing scheme for preventing deadlocks in Cartesian topologies is known as the Dimension Ordered Routing (DOR) scheme, which is described, for example, in "The architecture and programming of the Ametek series 2010 multicomputer," published in Proceedings of the third conference on hypercube concurrent computers and applications: Architecture, software, computer systems, and general issues, Volume 1, ACM, 1988, which is incorporated herein by reference. A DOR variant for torus topology is described, for example, in "Deadlock-free message routing in multiprocessor interconnection networks," IEEE Transactions on computers, Volume C-36, pages 547-553, May, 1987, which is incorporated here by reference.

SUMMARY

An embodiment that is described herein provides an apparatus, including a network interface and a processor. The network interface is configured to communicate with a network that includes a plurality of switches interconnected in a Cartesian topology having multiple dimensions. The processor is configured to predefine multiple turn types of turns in the Cartesian topology, each turn traverses a first hop along a first dimension, successively followed by a second hop along a second dimension, the first and second dimensions have same or different respective identities, and each turn type is defined at least by identities of the first and second dimensions. The processor is further configured to search for a preferred route via the network from a source switch to a destination switch, by evaluating candidate routes based at least on a number of VLs required for preventing a deadlock condition caused by the candidate route. The number of VLs required depends on a sequential pattern of the turn types of the turns formed by a sequence of hops in the candidate route. The processor configures one or more of the switches in the network to route packets from the source switch to the destination switch along the preferred route.

In some embodiments, the processor is configured to evaluate the candidate route by concatenating a candidate hop to the candidate route, and evaluating the number of VLs required depending on (i) the turn type of a turn created by the candidate hop followed by an initial hop of the candidate route, and (ii) the sequential pattern of turn types in the candidate route prior to concatenating the candidate hop. In other embodiments, the processor is configured to evaluate the candidate route by concatenating to the candidate route multiple different candidate hops to produce multiple respective extended candidate routes, and selecting an extended candidate route satisfying a predefined route selection criterion. In yet other embodiments, the route selection criterion includes one or more of (i) selecting a shortest-path route among the extended candidate routes, (ii) selecting an extended candidate route having a minimal number of VLs required among the extended candidate routes, and (iii) selecting an extended candidate route for which the number of VLs required meets a predefined VL budget.

In an embodiment, the processor is configured to predefine an order among identities of the dimensions of the Cartesian topology, and to predefine the turn types by defining: (i) a T0 turn type, for which the second dimension is higher in the order than the first dimension, or the second dimension equals the first dimension and the first and second hops have a same sign, a sign of a given hop is positive or negative depending on whether the given hop traverses to a switch having a respective higher or lower coordinate value in the dimension of the given hop, (ii) a T1 turn type, for which the second dimension is lower in the order than the first dimension and the sign of the second hop is positive, or the second dimension equals the first dimension, the sign of the first hop is negative, and the sign of the second hop is positive, and (iii) a T2 turn type, for which the second dimension is lower in the order than the first dimension and the sign of the second hop is negative, or the second dimension equals the first dimension, the sign of the first hop is positive, and the sign of the second hop is negative. In another embodiment, the switches are interconnected in a pristine torus topology, and the processor is configured to search the preferred route by evaluating candidate routes including one or more of the turn types T0, T1 and T2, and regardless of a number of dimensions including the pristine torus topology, the preferred route in the pristine torus topology requires a VL budget of up to three VLs, to prevent a deadlock condition.

In some embodiments, the processor is configured to configure the switches to re-associate a packet received by traversing a given hop and that is associated with a given VL, with a VL value that depends on (i) the given VL and (ii) a turn type of a turn created by the given hop followed by a next hop to which the packet is forwarded. In other embodiments, the processor is configured to define adaptive routing rules for the switches by defining for a given ingress interface of the source switch at least two egress interfaces for routing packets from the source switch to the destination switch without exceeding a predefined VL budget, and to configure the switches to apply adaptive routing from the source switch to the destination switch using the at least two egress interfaces. In yet other embodiments, the processor is configured to build adaptive routing rules for routing from a source switch to a destination switch, by finding two or more routes from the source switch to the destination switch, each route meets a predefined VL budget, and calculating the number of the VLs required by each route based on the turn type of the turn traversing from the source switch to a selected neighbor switch of the source switch, and on a precalculated route having a minimal number of VLs required for traversing from the selected neighbor switch to the destination switch.

In an embodiment, the processor is configured to search for the preferred route while refraining from evaluating candidate routes in which at least one of the switches, or a physical link connecting two of the switches, is missing from the Cartesian topology or malfunctions.

There is additionally provided, in accordance with an embodiment that is described herein, a method, including, in a processor communicating with a network that includes a plurality of switches interconnected in a Cartesian topology having multiple dimensions, predefining multiple turn types of turns in the Cartesian topology, each turn traverses a first hop along a first dimension, successively followed by a second hop along a second dimension, the first and second dimensions have same or different respective identities, and each turn type is defined at least by identities of the first and second dimensions. A preferred route via the network from a source switch to a destination switch is searched for, by evaluating candidate routes based at least on a number of VLs required for preventing a deadlock condition caused by the candidate route. The number of VLs required depends on a sequential pattern of the turn types of the turns formed by a sequence of hops in the candidate route. One or more of the switches in the network are configured to route packets from the source switch to the destination switch along the preferred route.

These and other embodiments will be more fully understood from the following detailed description of the embodiments thereof, taken together with the drawings in which:

DETAILED DESCRIPTION OF EMBODIMENTS

Overview

Figure 1:
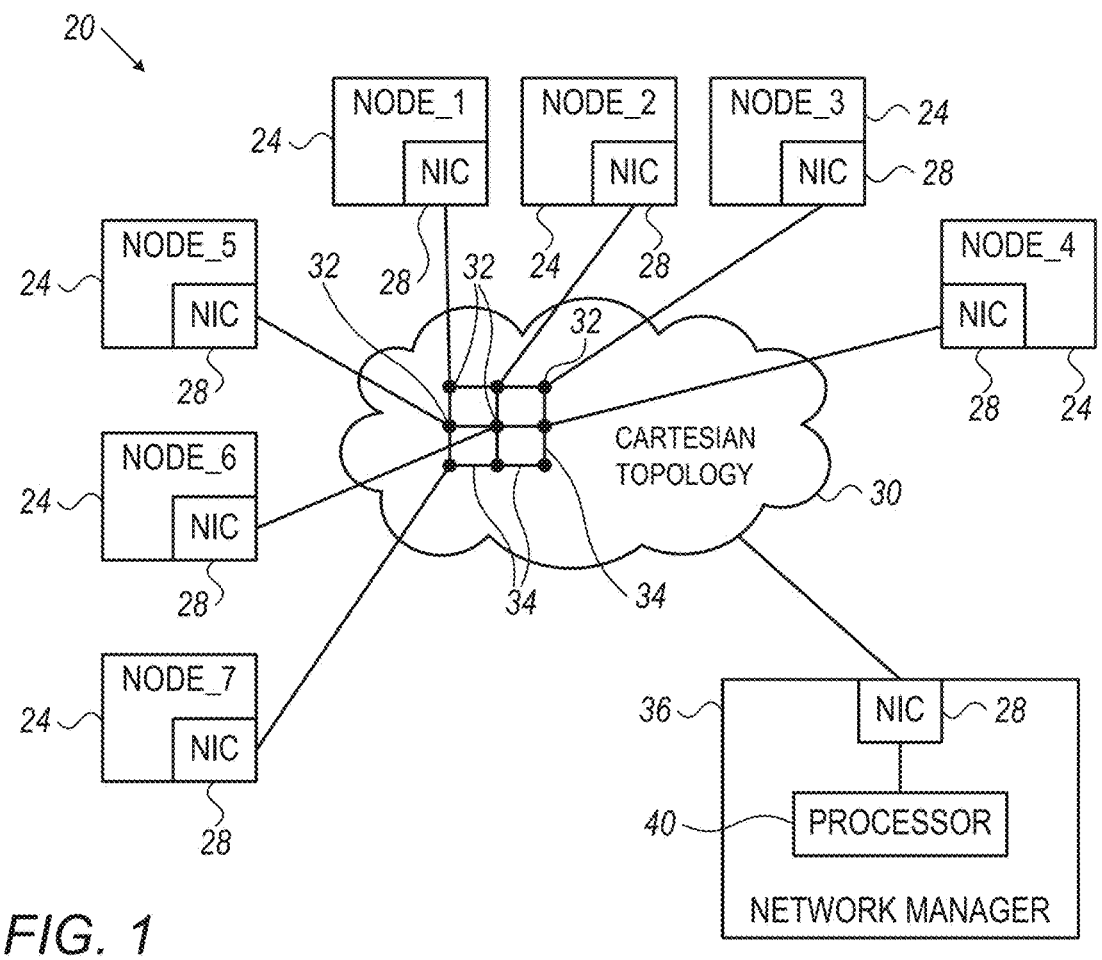
FIG. 1 is a block diagram that schematically illustrates a computer system, in accordance with an embodiment that is described herein.

Packets traversing a communication network are typically buffered temporarily in switches along the route. In networks that employ lossless link-level flow control, a switch typically sends flow control notifications indicative of the switch buffer status to its previous-hop neighbor switch. The previous-hop switch throttles transmission of packets over the link in question based on these notifications. In some practical situations, the buffers of multiple switches interconnected cyclically become full, and consequently, these switches are unable to further send or receive packets. Such an undesired condition is referred to as a "deadlock condition" or simply "deadlock" for brevity.

In some networks, the switches are arranged in a Cartesian topology such as mesh, torus, hypercube or generalized hypercube. Switches in a Cartesian topology are interconnected in a virtual grid and can be identified by respective Cartesian coordinates. In some Cartesian topologies such as, for example, the torus topology, boundary switches of the virtual grid are connected cyclically. A Cartesian topology may have any suitable dimensionality, such as two-dimensional (2D), three-dimensional (3D), or a higher dimensionality.

In principle, deadlocks in a Cartesian topology can be prevented using the Dimension Ordered Routing (DOR) scheme cited above, or using a combination of DOR and multiple buffer pools, referred to as virtual buffers or Virtual Lanes (VLs). The DOR scheme is inapplicable, however, in certain applications that require routing flexibility such as application using adaptive routing. In addition, the DOR scheme may be inapplicable when there is a faulty or missing switch or inter-switch link in the network.

Note that in general deadlock-freedom is a property of multiple routes combined. For example, if all the routes in the network are defined using the DOR scheme, deadlock freedom is guaranteed. If, however, a given route is derived using the DOR scheme, but there are other routes not obeying the DOR scheme, these routes and the DOR-derived route can together create a deadlock condition.

Embodiments that are described herein provide improved methods and systems for flexible construction of shortest-path and deadlock-free routes in networks having a multi-dimensional Cartesian topology. In the disclosed techniques, multiple turn types are predefined in the Cartesian topology, wherein each turn traverses a first hop along a first dimension, successively followed by a second hop along a second dimension, wherein the first and second dimensions have same or different respective identities. Each of the turn types is defined at least by identities of the first and second dimensions.

In some embodiments, a network-management computer, also referred to as a network manager, connects to the network and is used for configuring the network switches. For configuring the switches, the network manager selects routes between pairs of source and destination switches using a model of the actual network topology. In an embodiment, the network manager starts with a selected destination switch and scans the other switches in a Breadth First Search (BFS) order.

In some embodiments, the network manager comprises a processor that searches for a preferred route via the network from a source switch to a destination switch, by evaluating candidate routes based at least on a number of VLs required for preventing a deadlock condition caused by the candidate route. The number of VLs required depends on a sequential pattern of the turn types of the turns formed by a sequence of hops comprising the candidate route. The network manager configures one or more of the switches in the network to route packets from the source switch to the destination switch along the preferred route.

In some embodiments, during the BSF scan, the processor evaluates the candidate route by concatenating a candidate hop to a best candidate route calculated so far, and evaluating the number of VLs required depending on (i) the turn type of a turn created by the candidate hop followed by an initial hop of the candidate route, and (ii) the sequential pattern of turn types in the candidate route prior to concatenating the candidate hop. By attempting to concatenate multiple different candidate hops, the processor produces multiple respective extended candidate routes, and selects an extended candidate route satisfying a predefined route selection criterion. For example, the processor selects among the extended candidate routes a shortest-path route, and/or a route having a minimal number of VLs required among the checked candidate routes.

In some embodiments, after calculating static routing routes based on minimal number of VLs required, as described above, the processor may build adaptive routing rules for traversing from a source switch to a destination switch in the Cartesian topology. In some embodiments, the processor builds adaptive routing rules for routing from a source switch to a destination switch, by finding two or more routes from the source switch to the destination switch, each route meets a predefined VL budget, and calculating the number of the VLs required by each route based on the turn type of the turn traversing from the source switch to a selected neighbor switch of the source switch, and on a precalculated route having a minimal number of VLs required for traversing from the selected neighbor switch to the destination switch.

In some embodiments, the system supports a number Nq of Quality of Service (QoS) levels, wherein each of the QoS levels uses a VL budget denoted B. In such embodiments, the system needs to support a total number of VLs equal to Nq·B.

In some embodiments, each hop is associated with a positive or negative sign attribute depending on whether the hop traverses to a switch having a respective higher or lower coordinate value in the dimension of the hop. The turn types are thus defined based on dimensions and signs of the respective first and second hops of the turns.

In an embodiment, the processor configures the switches to re-associate a packet received by traversing a given hop and that is associated with a given VL, with a VL value that depends on (i) the given VL and (ii) a turn type of a turn created by the given hop followed by a next hop traversed by the forwarded packet.

In some embodiments, the processor defines adaptive routing rules for the switches by defining for a given ingress interface of the source switch at least two egress interfaces for routing packets from the source switch to the destination switch without exceeding a VL budget of the source switch. The processor configures the switches to apply adaptive routing from the source switch to the destination switch using the at least two egress interfaces.

In some embodiments, in searching for a preferred route, the processor refrains from evaluating candidate routes in which at least one of the switches, or a physical link connecting two of the switches, is missing from the Cartesian topology or malfunctions.

In the disclosed techniques multiple Virtual Lanes (VLs) may be assigned to packets traversing a given route, for preventing deadlocks. Since switches typically support a limited number of virtual buffers or VLs, the disclosed embodiments seek preferred routes that require a minimal number of VLs for preventing all deadlock conditions. In the disclosed techniques multiple turn types are specified in terms of the dimensions and signs of the underlying hops traversed. Using these turn types and related VL modification rules, preferred routes can be selected flexibly, resulting in a minimal number of VLs, among multiple candidate routes, required for preventing deadlock. A route in a cyclic Cartesian topology may fully cross the topology edges by traversing three consecutive hops along a selected dimension, the first and third hops have a same sign that is opposite to the sign of the second (middle) hop. Using the turn types defined in this disclosure ensures that each such crossing event increases the VL. Seeking routes having a minimal number of VLs tends to group multiple consecutive turns of the same type, which may result in a preferred route that avoids a full crossing of the topology edges in a cyclic topology, thus reducing the number of VLs required.

System Description

FIG. 1 is a block diagram that schematically illustrates a computer system 20, in accordance with an embodiment that is described herein. Computer system 20 comprises multiple host computers 24 which communicate with one another over a network 30 and thus function as network nodes of the network. Network nodes 24 connect to network 30 via respective Network Interface Controllers (NICs) 28. Although in the example of FIG. 1, the computer system comprises seven network nodes 24 denoted NODE_1 . . . NODE_7, a practical computer system may comprise any suitable number of network nodes.

Network 30 may comprise any suitable communication network such as, for example, an InfiniBand (IB) switch fabric, or packet networks of other sorts, such as Ethernet or Internet Protocol (IP) networks. Alternatively, network 30 may operate in accordance with any other suitable standard or protocol.

Network 30 typically comprises multiple network elements 32, which are interconnected via physical links 34 in accordance with some predefined network topology. Network elements 32 may comprise, for example, switches, routers, bridges, gateways, or any other suitable type of network elements. In the present example, network elements 32 comprise switches arranged in a Cartesian topology, such as mesh, torus hypercube or generalized hypercube. Each of network nodes 24 connects to a respective switch in the network, and is able to communicate over the network with all other network nodes. Network 30 may comprise one or more switches that are interconnected to other switches in the network but are not connected to any network node 24. In some practical embodiments, each switch may connect to multiple network nodes.

Switches in a given topology are referred to as "neighbor switches" when they connect to one another directly using a physical link. In the Cartesian topology of FIG. 1, neighbor switches are interconnected using physical links 34. A packet traversing from a given switch to a neighbor switch traverses one "hop" in the topology. In a Cartesian topology the coordinates of two neighbor switches that are interconnected directly differ in one, and only one, of the topology dimensions by one or more coordinate units. For example, the coordinates of two neighbor switches in a mesh or hypercube topology differ by just one coordinate unit in one of the topology dimensions. In torus and generalized hypercube topologies, however, the coordinates of two neighbor switches may differ in one coordinate unit or in multiple coordinate units in one of the topology dimensions.

In some embodiments, network 30 comprises a D-multi-dimensional Cartesian topology. The number of network elements per dimension may be a common across all the dimensions, or alternatively, may vary among different dimensions. The embodiments disclosed herein are applicable to both pristine networks in which all the switches (32) and physical links (34) on the virtual grid are present and function, as well as to faulty networks in which at least one switch or physical link is missing or failing.

Network 30 is managed using a central network-management computer, referred to herein as a network manager 36, comprising an interface 28 for connecting to network 30 (e.g., a NIC that is similar to the one used in the network nodes) and a processor 40. In some other embodiments, network manager 36 may be running atop one of the network nodes 24. The network manager enables a network administrator to setup the network and provision the network elements with routing information via the NIC. Alternatively, at least part of the provisioning is carried out by the network manager automatically.

In some embodiments, network manager 36 is aware of the network topology, i.e., the identities of the network elements and the manner in which they are interconnected, e.g., as configured manually by a network administrator via a suitable interface (not shown). Alternatively or additionally, the network manager learns the network topology automatically by interrogating network elements 32.

Among other tasks, network manager 36 defines routes between pairs of the network elements, based on the network topology, and configures relevant routing information to the network elements belonging to these routes.

The embodiments that will be described below are applicable to various Cartesian topologies, including mesh, torus, hypercube and generalized hypercube topologies. It is assumed that each of the switches in a D-dimensional Cartesian topology is associated with a D-dimensional coordinate of the underlying virtual grid. In a mesh topology the switches are arranged in a D-dimensional virtual grid, and each switch connects to its neighbor switches having nearest respective coordinates in the virtual grid. The structure of a torus topology is similar to that of the mesh topology, but unlike the mesh topology, the torus topology additionally includes cyclic connections between switches at the edges of the virtual grid. The hypercube topology is a type of a Cartesian mesh topology traversing only a single hop along each dimension. The generalized hypercube topology extends the torus topology by interconnecting all the switches along some axis rather than interconnecting only neighbor switches of nearest coordinates.

A route in a D-dimensional Cartesian topology traverses a sequence of one or more hops, wherein each hop traverses from a switch (or source node) to a successive switch (or destination node) along the route. Each hop traverses one of the topology dimensions, corresponding to the topology coordinate that changes between the two switches.

In some embodiments, network manager 36 defines multiple types of turns in the Cartesian topology, wherein each turn traverses two consecutive hops. The sequence of hops comprising a given route, forms a sequence of turns having some sequential pattern of the respective turn types. As will be described below, the network manager evaluates candidate routes based on the number of VLs required for preventing deadlock, which number depends on a sequential pattern of the turn types corresponding to the candidate routes. By selecting preferred candidate routes, the network manager is able to define shortest-path deadlock-free routes, with a very low number of VLs required for preventing deadlocks, for non-pristine topologies and for adaptive routing.

Although in computer system 20 of FIG. 1 network manager 36 is implemented on a dedicated network node, in alternative embodiments, the network manager can be implemented within one of network nodes 24, and its functionality executed by a processor of the network node. Further alternatively, at least one of the switches in the network may comprise a "managed switch" attached to a processor, and the network manager (or part thereof) may reside on the managed switch.

Figure 2:
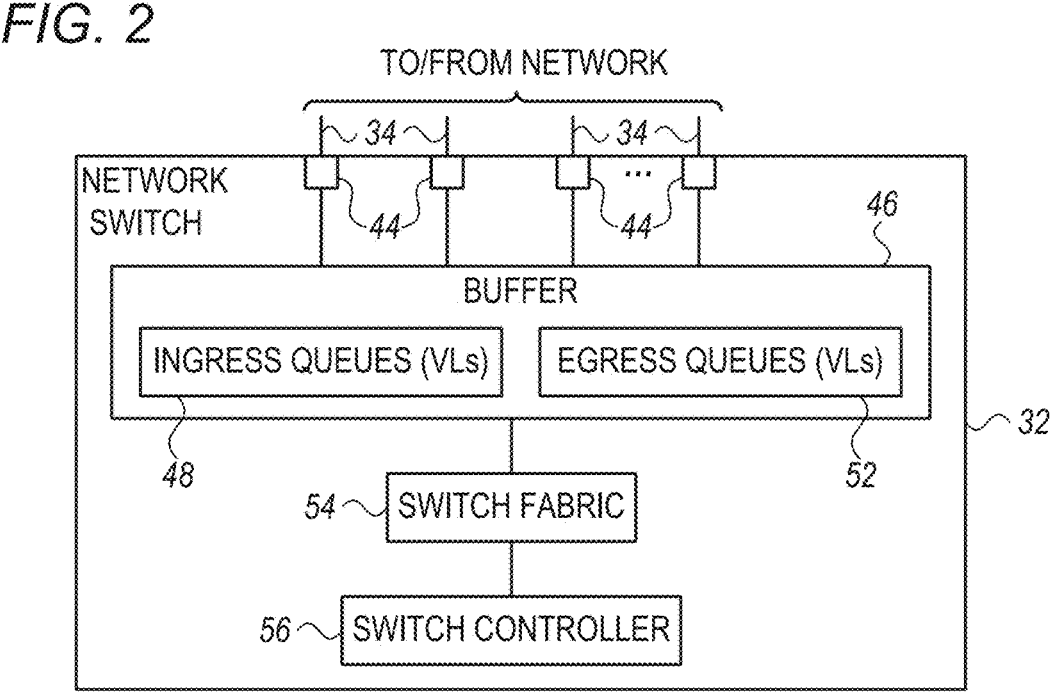
FIG. 2 is a block diagram that schematically illustrates a network switch, in accordance with an embodiment that is described herein.

FIG. 2 is a block diagram that schematically illustrates network switch 32, in accordance with an embodiment that is described herein. Although the description that follows refers mainly to a network switch, the disclosed techniques can be used with various other types of network elements.

Switch 32 comprises multiple ports 44 for exchanging data packets with network 30 via physical links 34. In some embodiments, a given port 44 can function as an ingress interface for incoming packets or as an egress interface for outgoing packets. Alternatively, a port 44 can function as both ingress and egress interfaces.

Switch 32 comprises a buffer 46, which comprises one or more ingress queues 48 for storing packets arriving from the network via the ingress interfaces of ports 44, and one or more egress queues 52 for storing packets awaiting transmission to the network via the egress interfaces of ports 44. In some embodiments, buffer 46 comprises a shared buffer in which queues of different sizes may be dynamically allocated to different ingress or egress interfaces, or in accordance with any other suitable criterion.

Packets traversing the network may belong to different flows. In some embodiments, physical links 34 in network 30 are each shared by multiple logical communication links, also referred to as virtual channels. In InfiniBand, the virtual channels are also referred to as Virtual Lanes (VLs).

In one embodiment, for supporting multiple VLs, ingress queues 48 and egress queues 52 are each divided into multiple logical queues that store the packets in accordance with the VL to which the packets are assigned. Alternatively, each of ingress queues 48 and egress queues 52 comprises multiple dedicated queues for the respective VLs. The queues allocated respectively for the VLs are also referred to herein as "virtual buffers."

In an embodiment, switch 32 receives via an ingress interface packets assigned to an input VL value, and replaces this input VL value in the packets headers with a different output VL value before transmitting the packets back to the network via one of the egress interfaces. The mapping from an input VL value to an output VL value is part of the routing information provisioned to the switch by the network manager. In some of the embodiments disclosed below, changing the VL value assigned to a packet traversing the switch is used for preventing deadlock conditions in networks having a Cartesian topology. In some embodiments, a switch decides to modify the VL of a packet received depending on (i) the VL value, e.g., whether the VL value of the received packet is even or odd, and (ii) the type of turn formed by the two hops intermediated by that switch.

Switch 32 comprises a configurable switch fabric 54, which forwards packets between ports 44 in accordance with a certain routing plan. Typically, each packet belongs to a certain flow. By routing a certain flow to a certain port, switch fabric 54 causes the packets of that flow to be routed over a certain routing path through network 30.

In the context of the present patent application and in the claims, the term "packet" is used to describe the basic data unit that is routed through the network. Different network types and communication protocols use different terms for such data units, e.g., packets, frames or cells. All of these data units are regarded herein as packets.

Switch 32 comprises a switch controller 56, which configures switch fabric 54 to apply the desired routing plan. By controlling the routing plan, switch 32 is able to cause the packets to traverse various routing paths through network 30.

In some embodiments, switch 32 supports adaptive routing by allowing packets received in a given ingress interface to be routed via one of multiple egress interfaces. To re-route a given flow, switch controller 56 selects for the flow packets, which the switch receives via an ingress interface, a different egress interface. In an example embodiment, switch 32 may save the current associations between ingress and egress interfaces in a Forwarding Database (FDB) (not shown in the figure). Alternatively, switch 32 may hold a set of routing rules, e.g., per flow. In some cases, the packets are routed without recording any information for future use.

In some embodiments, forwarding the packets is based on certain fields in the packet headers. The fields may include, for example, at least one of the source address and destination address, the underlying protocol and the source and destination port numbers. In some embodiments, forwarding the packets comprises calculating a hash function over one or more fields in the packet headers, and using the result hash value for selecting a respective egress interface for the packet.

The configurations of computer system 20, network manager 36 and switch 32 in FIGS. 1 and 2 are example configurations, which are chosen purely for the sake of conceptual clarity. In alternative embodiments, any other suitable configurations can also be used. The different elements of network manager 36 and switch 32 may be implemented in hardware, such as using one or more Application-Specific Integrated Circuits (ASICs) or Field-Programmable Gate Arrays (FPGAs). In alternative embodiments, some elements of network manager 36 and/or switch 32, e.g., processor 40 and/or switch controller 56, may be implemented in software executing on a suitable processor, or using a combination of hardware and software elements.

Elements that are not necessary for understanding the principles of the present application, such as various interfaces, addressing circuits, timing and sequencing circuits and debugging circuits, have been omitted from FIGS. 1 and 2 for clarity.

In some embodiments, processor 40 and/or switch controller 56 may comprise general-purpose processors, which are programmed in software to carry out the network manager and/or switch functions described herein. The software may be downloaded to the processors in electronic form, over a network, for example, or it may, alternatively or additionally, be provided and/or stored on non-transitory tangible media, such as magnetic, optical, or electronic memory.

Routing in Cartesian Topologies

A route between two network elements may comprise one or more route segments. In the present context, the term "route segment," or simply "segment," for brevity, means a route or part of a route traversing two or more consecutive switches along one dimension. A segment between two switches that are directly connected to one another, e.g., neighbor switches in the Cartesian topology, is also referred to herein as a "hop."

In some embodiments, each hop is associate with a sign attribute. The sign of a hop is referred to as "positive" when the hop traverses to a higher coordinate value in the traversed dimension. Similarly, the sign of a hop is referred to as "negative" when the hop traverses to a lower coordinate value in the traversed dimension.

As noted above, in some embodiments, network manager 36 defines multiple types of turns in the Cartesian topology. Each turn traverses a first hop along a first dimension, successively followed by a second hop along a second dimension, and each of the turn types is defined by the identities of the first and second dimensions and by the signs of the first and second hops of that turn.

The sequence of hops comprising a given route, forms a sequence of turns having some sequential pattern of the respective turn types. In some embodiments, turns of certain types may result in increasing the number of VLs required to prevent deadlock. The actual number of VLs required for preventing deadlock caused by a route depends on the sequential pattern of the turn types of the turns formed by the underlying sequence of hops.

Figure 3:
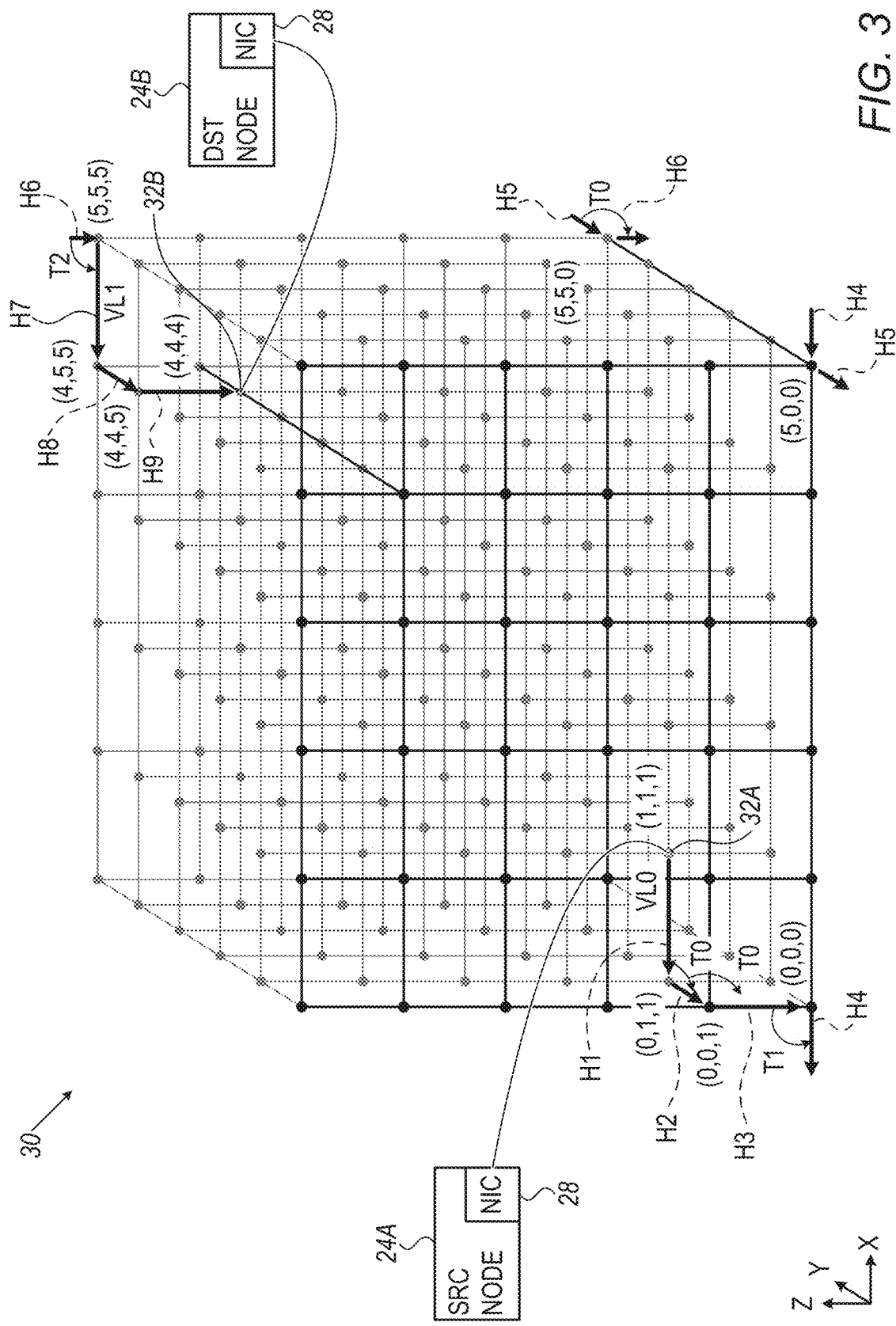
FIG. 3 is a diagram that schematically illustrates a network configured in a three-dimensional (3D) Cartesian topology, and a route of hops between a source switch and a destination switch forming a sequence of turns, in accordance with an embodiment that is described herein.

FIG. 3 is a diagram that schematically illustrates a network configured in a three-dimensional (3D) Cartesian topology, and a route of hops between a source switch 32A and a destination switch 32B forming a sequence of turns, in accordance with an embodiment that is described herein.

The example network in FIG. 3 comprises multiple switches 32 arranged in a Cartesian topology, wherein at least some of the links interconnecting the switches (such as physical links 34 in FIG. 1) are omitted, for clarity. Network nodes 24A and 24B communicate with one other over the network by connecting to source switch 32A and to destination switch 32B, respectively. Consider the communication direction from network node 24A to network node 24B. In this direction, packets sent by network node 24A are routed by switch 32A to traverse multiple other switches in the network toward destination switch 32B, which routes the packets to network node 24B.

The topology in FIG. 3 is a three-dimensional Cartesian topology whose dimensions are specified in three respective dimension axes denoted X, Y and Z. In the present example, each of the topology dimensions comprises six switches. As such, each switch in the Cartesian topology has a coordinate comprising three coordinate values denoted $(C_x, C_y, C_z)$ in the range 0 ... 5. For example, switches 32A and 32B in FIG. 3, have respective coordinates (1,1,1) and (4,4,4).

FIG. 3 depicts an example route in the 3D topology from source switch 32A at coordinate (1,1,1) to a destination switch (32B) at coordinate (4,4,4). The route traverses a sequence of switches having the following respective coordinates: (1,1,1), (0,1,1), (0,0,1), (0,0,0), (5,0,0), (5,5,0), (5,5,5), (4,5,5), (4,4,5) and (4,4,4).

The route of FIG. 3 comprises 9 hops denoted H1 ... H9 starting with a hop H1 from coordinate (1,1,1) to coordinate (0,1,1), and ending with a hop H9 from coordinate (4,4,5) to coordinate (4,4,4).

As noted above, each hop may be associated with a positive or negative sign attribute, depending on whether the hop traverses to a higher or to a lower coordinate value in the dimension being traversed. Table 1 below summarizes dimension and sign attributes of the sequence of hops comprising the route in FIG. 3. The coordinate values that change in each hop are marked with an underline mark. A hop having a positive (or a negative) sign attribute is also referred to herein as a "positive hop" (or a "negative hop").

TABLE 1

A sequence of hops comprising the route of FIG. 3

| Hop | From coordinate | To coordinate | Dimension | Hop sign |
|---|---|---|---|---|
| H1 | (1, 1, 1) | (0, 1, 1) | X | (−) |
| H2 | (0, 1, 1) | (0, 0, 1) | Y | (−) |
| H3 | (0, 0, 1) | (0, 0, 0) | Z | (−) |
| H4 | (0, 0, 0) | (5, 0, 0) | X | (+) |
| H5 | (5, 0, 0) | (5, 5, 0) | Y | (+) |
| H6 | (5, 5, 0) | (5, 5, 5) | Z | (+) |
| H7 | (5, 5, 5) | (4, 5, 5) | X | (−) |
| H8 | (4, 5, 5) | (4, 4, 5) | Y | (−) |
| H9 | (4, 4, 5) | (4, 4, 4) | Z | (−) |

In the present example, hop H1 has a negative sign in the X dimension because by traversing H1 coordinate Cx changes from a coordinate value Cx=1 to a lower coordinate value Cx=0. As another example, hop H5 has a positive sign in the Y dimension, because coordinate Cy changes by traversing H5 from a coordinate value Cy=0 to a higher coordinate value Cy=5.

As described above, a turn in the Cartesian topology is a route segment comprising two successively traversed hops. The types of the turns depend on the dimensions and signs of the two hops comprising the turn. In defining the turn types the following hop notations are used, assuming that the hop in question traverses the $i^{th}$ dimension, and is an integer number $1 \leq i \leq D$:

+$x_i$—A hop having a positive sign attribute.
−$x_i$—A hop having a negative sign attribute.
±$x_i$—A hop having a positive or negative sign attribute.

The network manager also defines an order 1 ... D among the topology dimensions. A dimension i is considered lower (or higher) in the order than a dimension k, when i<k (or i>k).

In some embodiments, the network manager uses the above notations to predefine three turn types as follows:

TABLE 2

Definitions of turn types T0, T1 and T2

| Turn type | First hop | Second hop | Condition |
|---|---|---|---|
| T0 | ±$x_i$ | ±$x_k$ | i < k |
|  | +$x_i$ | +$x_i$ | Same dimensions |
|  | −$x_i$ | −$x_i$ | and signs |
| T1 | ±$x_i$ | +$x_k$ | i > k |
|  | −$x_i$ | +$x_i$ | Same dimension neg-pos signs |
| T2 | ±$x_i$ | −$x_k$ | i > k |
|  | +$x_i$ | −$x_i$ | Same dimension pos-neg signs |

In a turn of type T0, the second hop traverses a dimension higher than the dimension traversed by the first hop. Alternatively, in a turn of type T0 the first and second hops travers the same dimension and are both positive or both negative.

In a turn of type T1, the second hop traverses a dimension lower than the dimension traversed by the first hop and the second hop is positive. Alternatively, in a turn of typo T1, the first and second hops travers the same dimension, the first hop is negative, and the second hop is positive.

In a turn of type T2, the second hop traverses a dimension lower than the dimension traversed by the first hop and the second hop is negative. Alternatively, in a turn of type T2, the first and second hops travers the same dimension, the first hop is positive, and the second hop is negative.

The sequence of hops traversed by a given route forms a sequence of turns having respective turn types. In the present example, the sequence of hops of Table 1 is translated to the sequence of turn types as given in Table 3 below.

TABLE 3

A sequence of turn types associated with the route of FIG. 3

| | Turn hops | | | | | | | |
|---|---|---|---|---|---|---|---|---|
| | H1-H2 | H2-H3 | H3-H4 | H4-H5 | H5-H6 | H6-H7 | H7-H8 | H8-H9 |
| Dims/Signs | −X, −Y | −Y, −Z | −Z, +X | +X, +Y | +Y, +Z | +Z, −X | −X, −Y | −Y, −Z |
| Turn type | T0 | T0 | T1 | T0 | T0 | T2 | T0 | T0 |

In some embodiments, based on the predefined turn types T0, T1 and T2, the network manager configures each switch 32 in the network to conditionally modify the VL assigned to a packet received in the switch, in order to prevent deadlock conditions, using the following rules:

TABLE 4

Rules applied by switches for conditionally modifying VLs of received packets to prevent deadlocks

| Rule for VL modification | Type of turn created by switch | Ingress VL | Egress VL |
|---|---|---|---|
| Rule1 | T0 | VL | VL |
| Rule2 | T1 | VL odd | VL + 1 |
|  |  | VL even | VL |
| Rule3 | T2 | VL even | VL + 1 |
|  |  | VL odd | VL |

In the present example, VL values comprises nonnegative integer values. The source node sends to the network packets assigned with VL=0. In accordance with the rules of Table 4, the packet traversing a route may reach the destination node with a VL≥0. The actual VL value of the packet delivered to the destination node depends on the sequential pattern of the turn types associated with the route traversed from the source node to the destination node. Consider some examples:

A turn of type T0 causes no VL modification.
A sequence of turn types comprising only T0 and T1, in any order, causes no VL modification.
A sequence of turn types comprising only T0 and T2 types, in any order, results in modifying the VL from VL=0 to VL=1 only once along the entire route.
A sequence of turn types comprising both T1 and T2, results in modifying the VL depending on the number of occurrences in which T1 appears in the sequence before T2 (while ignoring turns in the sequence having a T0 turn type) and on the number of occurrences in which T2 appears in the sequence before T1 (while ignoring turns in the sequence having a T0 turn type). For example, the sequence of turn types T0/T1/T0,T2 results in a final value VL=1, whereas the sequence of turn types T0/T2/T0/T1 results in a final value VL=2.

In the example of FIG. 3 above, the turn T2 traversing hops H6 and H7 causes modifying the VL from VL0 to VL1.

In a cyclic Cartesian topology, a deadlock condition may occur by a combination of multiple routes creating a round route on the same dimension. In some embodiments, deadlock avoidance is guaranteed by increasing the VL value before closing the round route on the same dimension. In such embodiments, turns of types T1 and T2 are used, in order to increase the VL value while traversing a round route on the same dimension. It can be shown that any combined round route whose hops traversing the same dimension contains both turn types T1 and T2 and therefor VL increase is guaranteed.

A route that makes a full crossing of the topology edges in some dimension can be defined in terms of turns, e.g., three hops are defined as follows: h1[1→0], h2[0→(X−1)] and h3[(X−1)→(X−2)], wherein 0,1,X−2 and X−1 are coordinate values along the underling dimension axis. A route segment comprising a hop sequence h1→h2→h3 crosses the topology edges by traversing h2. The corresponding sequence of turns comprises a turn of type T1 followed by a turn of type T2. Similarly, a route segment that starts at coordinate X−2, crosses the topology edges by traversing from coordinate X−1 to coordinate 0, and ends at coordinate 1, comprises a turn of type T2 followed by a turn of type T1. A route that crosses the topology edges comprises a route segment forming a sequence of two turns of types (T1,T2) or (T2,T1), and therefore results in VL modification (VL increase). In terms of hops, a route segment crosses the topology edges by traversing three consecutive hops along a selected dimension, wherein the first and third hops have a same sign that is opposite to the sign of the second (middle) hop. As will be described below, in some embodiments, routes that cross the topology edges may be avoided by preferring other routes having a lower number of VLs required.

For example, in the topology of FIG. 3, a route segment that crosses the topology edges by traversing switches at coordinates (4,2,2)→(5,2,2)→(0,2,2)→(1,2,2) has a corresponding sequence of turn types (T2,T1). A route segment traversing these four switches in the opposite direction (1,2,2)→(0,2,2)→(5,2,2)→(4,2,2) crosses the topology edges and has corresponding sequence of turn types (T1,T2). Note that a conventional DOR method would produce a route between the source and destination of FIG. 3, which would fully cross the topology edge three times, and would increase the VL at least three times. Using the flexibility of turn types T0, T1 and T2, while seeking route with minimal VL increase a route in FIG. 3 does not fully cross the topology edges and therefore increases the VL only once.

A closed route, which can cause a deadlock condition, is a route that starts with a given hop and ends with the same given hop. It can be shown that a pattern of turn types associated with a closed route in a Cartesian topology must have at least one turn of type T1 and at least one turn of type T2. Therefore, in a route that contains one or more turns of type T1 and one or more types of T2, the VL of a packet traversing the route will increase, and therefore such routes are deadlock free. A proof of this argument is given further below in an Appendix section.

Constructing routes in a Cartesian topology using the turn types T0, T1 and T2 may result in routes that together create a deadlock condition. Deadlocks can be avoided, however, by routing the packets to a different VL, e.g., using the rules of Table 4 above. It can be shown that the number of VLs required for preventing all deadlocks in a Cartesian topology (e.g., a mesh, torus, hypercube or generalized hypercube topology) depends on the sequential pattern of turn types formed along the routes.

Using the VL modification rules of Table 4 above, results in a small VL budget, because VL modification does not depend only on the number of occurrences of individual turn types along the route, but also on the order in which the turn types appear along the route. In general, grouping along the route multiple turns of the same type in sequence may reduce the required VL budget. For the same reason (the turn type grouping), using the VL modification rules of Table 4 above, results in a larger set of adaptive routes for the same VL budget.

Note that in a cyclic Cartesian topology, a route in which three consecutive hops on the same dimension, wherein the middle hop crosses between the edge coordinates of the topology in that dimension causes an increase to the VL. Constructing routes using the turn types T0, T1 and T2, however, provides flexibility to choose routes that avoid such a three-hop segment, thus reducing the number of VLs required. For example, in a D-dimensional torus topology, there are several Dimension Ordered Route (DOR) routes that fully cross the topology edges D times. It can be shown that using the T0, T1 and T2 turn types definitions, in a pristine torus topology, for any number of dimensions comprising the pristine torus topology, the resulting preferred route requires a VL budget of up to three VLs to prevent a deadlock condition (the VL value is incremented only two times).

Constructing Deadlock-Free Routes in Cartesian Topologies

Next we describe methods for constructing shortest-path deadlock-free routes in a network having a Cartesian topology. In some embodiments, for a given Cartesian topology, multiple candidate routes are examined, and a route having the minimal number of VLs among the candidate routes is selected. Other selection criteria such as selecting a shortest-path route can also be imposed.

Figure 4:
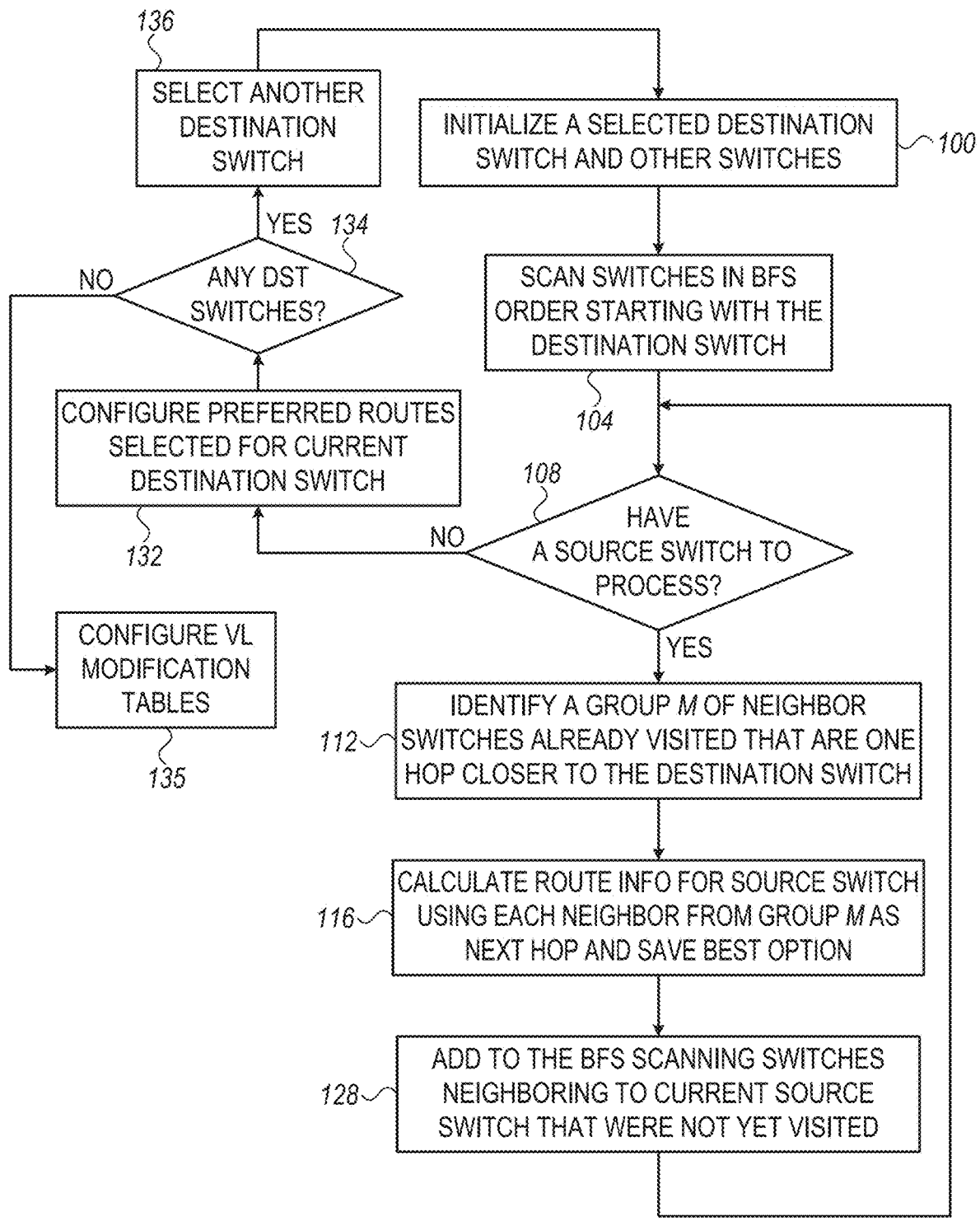
FIG. 4 is a flow chart that schematically illustrates a method for constructing preferred routes in a Cartesian topology, in accordance with an embodiment that is described herein.

FIG. 4 is a flow chart that schematically illustrates a method for constructing preferred routes in a Cartesian topology, in accordance with an embodiment that is described herein. The method is described as executed by processor 40 of network manager 36.

In some embodiments, processor 40 models the Cartesian topology of the underlying network as a group of multiple vertices that are interconnected via edges in accordance with the actual network topology. Using this model, the vertices correspond to respective switches 32, and the edges correspond to respective physical links 34 of network 30.

In describing the method of FIG. 4, the symbol "S" denotes the group of all switches 32 in the network, the symbol "s" denotes a source switch and the symbol "$s^d$" denotes a destination switch for a route starring at s. In constructing candidate routes, the network manager characterizes the switches using the following attributes:

s.dist—denotes the distance from s to $s^d$. Each hop increases the distance by a single distance unit.

adj(s)—denotes the group of neighbor switches to s, i.e., switches that connect to switch s directly over a single hop.

s→t denotes a hop traversing from switch s to a subsequent switch t.

The network manager calculates the following route attributes for a route from switch s to $s^d$, starting with a hop s→t:

dim(s→t) denotes the dimension traversed by hop s→t.

sign(s→t) denotes the sign attribute of hop s→t.

inc(s→t) denotes the number of VL increases along the route starting with hop s→t toward destination switch $s^d$.

turnType(s→t) denotes the turn type of a turn formed by a hop (s→t) followed by a subsequent hop (t→t') from switch t to a next-hop switch t' along the route toward $s^d$.

The network manager calculates the route attributes above, for all the switches connected directly to s and that are closer (in number of hops) to $s^d$ than s.

The network manager saves switch attributes of a switch s corresponding to a preferred route from s to $s^d$ as follows:

s.hopDim—denotes the dimension traversed by the hop from s to the next-hop switch toward $s^d$.

s.hopSign—denotes the sign attribute (positive or negative) of the hop from s to the next-hop switch toward $s^d$.

s.inc—denotes the number of VL increases along the route from s to $s^d$.

s.turnType—denotes the first turn of type T1 or T2 encountered in the route from s to $s^d$. When all the turns along the route from s to $s^d$ have a turn type T0, set s.turnType to T0.

In some embodiments, the network manager manages a queue of switches to be processed, denoted Q(s). The queue Q(s) operates in a First-In First-Out (FIFO) order, using an operator Q.push(s) for adding a switch s to the queue end, and an operator Q.pop( ) for popping a switch out of the queue.

The method begins with processor 40 selecting a destination switch $s^d$ among the network switches in S, and initializing switch $s^d$, at an initialization step 100. Processor 40 may select the destination switch among the switches in S sequentially, or using any other suitable selection criteria. To initialize switch $s^d$, the processor sets the switch attributes as follows:

$$\begin{cases} s^d \cdot dist = 0 \\ s^d \cdot inc = 0 \\ s^d \cdot hopDim = \infty \\ s^d \cdot hopSign = 0 \\ s^d \cdot turnType = T0 \end{cases} \quad \text{Equation 1}$$

In Equation 1, the symbol ∞ can be implemented as an integer larger than the number D of topology dimensions. Further at step 100, the processor initializes the other switches in the network as given by:

$$\forall s \neq s^d \in S: s.dist=\infty, s.inc=\infty \quad \text{Equation 2}$$

In Equation 2, the symbol ∞ for s.dist and s.inc can be implemented as an integer larger than the length of the longest route in the network.

At a BFS scanning step 104, the processor sets a unity distance to the distance attribute of the neighbor switches of $s^d$, and pushes the neighbor switches into the BFS queue as given by:

$$\forall s \in adj(s^d): s.dist=1, Q.push(s) \quad \text{Equation 3}$$

At a queue checking step 108, the processor checks whether there are any switches queued for processing, and if so, the processor pops a switch s' from the BFS queue and proceeds to a neighbor identification step 112.

At step 112, the processor identifies for switch s' neighbor switches t that are directly connected to s' and that were already visited by the BSF scanning. As such, a route to the destination switch was already selected for each of these neighbor switches that are each one hop closer to $s^d$ than s'. The group of switches identified at step 112 is denoted M(s') and is given by:

$$M(s')=\{t: t \in adj(s') \wedge t.dist=s'.dist-1\} \quad \text{Equation 4}$$

Note that in selecting preferred routes using M(s') as defined in Equation 4, the processor refrains from evaluating candidate routes in which at least one of the switches, or a physical link connecting two of the switches along the candidate route, is missing from the Cartesian topology or malfunctions, because such a switch or link does not exist in the topology or fails to satisfy the condition (t.dist=s'.dist−1) in Equation 4.

At a route selection step 116, the processor calculates route information attributes for one or more candidate routes from s' to $s^d$, wherein s' belongs to M(s'). The processor evaluates each candidate route from s' to $s^d$, based on suitable selection criteria. For example, in some embodiments the processor evaluates the candidate routes from s' to $s^d$ based on the number of VLs required to prevent deadlock and selects a preferred route from s' to $s^d$ that requires the minimal number of VLs among the candidate routes.

In some embodiments, at step 116 the processor verifies that the selected candidate route meets a predefined VL budget constraint by verifying that the variable inc(s'→t) does not exceeds the VL budget. When all the candidate routes fail to meet the VL budget, the processor may issue a suitable warning.

In some embodiments, the processor evaluates a candidate route by calculating the number of VL increases inc (s'→t) along the route starting with hop s'→t toward destination switch $s^d$. To this end, the processor first calculates the route attribute turnType(s'→t) as follows:

If [dim(s'→t)==t.hopDim AND sign(s'→t)!=t.hopSign] then:
  If [t.hopSign==1], set turnType(s'→t)=T1.
  Else ([t.hopSign==−1]), set turnType(s'→t)=T2.
If [dim(s'→t)==t.hopDim AND sign(s'→t)==t.hopSign] OR [dim(s'→t)>t.hopDim], set turnType(s'→t)=T0.
If [dim(s'→t)>t.hopDim AND t.hopSign==1], set turnType(s'→t)=T1.
If [dim(s'→t)>t.hopDim AND t.hopSign==−1], set turnType(s'→t)=T2.

The processor uses the values of turnType(s'→t) and t.turnType in calculating the route attribute inc(s'→t) as given in Table 5 below.

TABLE 5

Calculation of inc(s'→t) based on turnType(s'→t) and t.turnType

| turnType(s'→t)/ t.turnType | T0 | T1 | T2 |
|---|---|---|---|
| T0 | t.inc | t.inc | t.inc + 1 |
| T1 | t.inc | t.inc | t.inc + 2 |
| T2 | t.inc | t.inc | t.inc |

For example, consider route from t to $s^d$ resulting in a sequence of turn types T0-T1-T2-T0. The resulting route attributes are t.turnType=T1 and t.inc=1. If in adding a hop s'→t for which turnType(s'→t)=T2, then in accordance with Table 5 inc(s'→t)=t.inc+2=3. The updated sequence of turn types is T2-T0-T1-T2-T0. For a packet traversing the updated route starting with VL=0 at s', VL increases by each of the T2 and T1 turn types, resulting in VL=3 at the destination $s^d$.

In searching for preferred routes, hop (s'→t) serves as a candidate hop that the processor attempts to concatenate to the candidate route from t to $s^d$ so as to produce an extended candidate route. In some embodiments, the processor attempts concatenating to the candidate route multiple different candidate hops to produce multiple respective extended candidate routes, and selects an extended candidate route satisfying a predefined route selection criterion.

The processor saves route information for the preferred route selected starting with a hop s'→t toward $s^d$ as follows $$\begin{cases} s' \cdot inc = inc(s' \to t) \\ s' \cdot hopDim = dim(s' \to t) \\ s' \cdot hopSign = sign(s' \to t) \end{cases} \quad \text{Equation 5}$$

and determine s'.turnType as:

If turnType(s'→t)!=T0, s'.turnType=turnType(s'→t)

else s'.turnType=t.turnType  Equation 6

At step 116, various criteria can be used for selecting a preferred route from among the candidate routes. Example selection criteria comprise:

Select routes having a smaller number of VLs.
Prefer a candidate hop that creates a turn of type T2 over a turn of type T1, because a concatenated hop in the subsequent iteration (creating a turn of any type) will not increase the total number of VLs required.
Select routes traversing high dimensions, because such a selection increases the probability that the hop concatenated in the subsequent iteration will traverse a lower dimension, thus generating a turn of type T0 that does not increase the required number of VLs required.

In a cyclic Cartesian topology, the above selection criteria result in preferring routes having a minimal number of VLs required, from any source to any destination. In some embodiments, the criterion of selecting routes with smaller number of VLs is combined with one or more other selection criteria (e.g., as described above) to be used as a combined selection criterion.

At a BSF queuing step 128, the processor pushes to the BFS queue neighbors of s' that were not yet processed, as given by:

∀t∈adj(s'),t.dist=∞: Q.push(t)  Equation 7

In Equation 7, the symbol co can be implemented as described in Equation 2 above. Following step 128, the processor loops back to step 108, to check the occupancy of the BFS queue, and to processes subsequent queue entries, if any.

If at step 108, the BFS queue is empty, the processor proceeds to a route configuration step 132, in which the processor configures the switches comprised in the routes selected for the current destination switch. For example, the processor configures relevant routing information within switch fabric 54 of the relevant switches.

At a loop termination check step 134, the processor checks whether there are any destination switches in the fabric to be processed, and if so, proceeds to a destination switch re-selection step 136, at which the processor selects a subsequent destination switch in the network, and loops back to step 100 to construct preferred routes toward the selected destination switch. Otherwise, when at step 134 all the network switches have been scanned the processor proceeds to a VL configuration step 135. In some embodiments, the processor may keep a record of the maximal VL increase required in the fabric, if the maximal VL increase required exceeds the VL budget, the processor may decide to configure a different (larger) VL budget. In this case the processor may also reconfigure the number of supported VLs in the system.

At step 135 the processor configures the fabric switches with VL modification tables. An entry of the VL modification table defines an egress VL for a packet depending on the, input port via which the packet was received, the output port to which the packet is destined the ingress VL value of the packet and the VL budget (the VL value will not be increased even when required by the taken turn type, when the VL budget is exceeded by such a VL increase). Following step 135 the method terminates.

Several variant methods to the method of FIG. 4 are now described. In the method of FIG. 4 the network manager prefers shortest-path routes (that have the minimal number of hops) among the candidate routes. In alternative embodiments, the requirement for shortest-path routes may be relaxed, to consider longer routes. This approach may be useful for example, in a generalized hypercube topology, for enabling an adaptive routing scheme to select among multiple candidate routes traversing different route segments, possibly having different respective lengths, along the same dimension.

In the method of FIG. 4, the network manager constructs a route starting at the destination switch and adding one hop at a time toward the source switch. In this method, in adding a given hop, the network manager prefers adding a hop that creates a turn of type T2 over T1, as described above. In alternative embodiments, the network manager saves multiple candidates up to the source switch, each candidate starts with different turn type, and then selects a route that requires the minimal number of virtual buffers, from among these candidate routes. This technique may result in a lower number of virtual buffers then using a method that excludes candidate routes before reaching the source switch.

In the method of FIG. 4, based on the VL modification rules of Table 4, an event of a full crossing of the topology edges causes increasing the packet's VL by 1 or 2. Note, however, that for preventing deadlock it is sufficient to increase the VL upon a full crossing of the topology edges by 1, which requires lower VL budget.

In an embodiment, to avoid such redundant VL increase, in a torus topology, an additional turn type denoted T3 is defined for identifying two hops traversal on same dimension with opposite hop signs. Updated definitions of the turn types including turn type T3 are provided in Table 6, which replaces Table 2 above.

TABLE 6

Definitions of turn types T0, T1, T2 and T3

| Turn type | First hop | Second hop | Condition |
|---|---|---|---|
| T0 | ±$x_i$ | ±$x_k$ | i < k |
|  | +$x_i$ | +$x_i$ | Same dimensions |
|  | −$x_i$ | −$x_i$ | and signs |
| T1 | ±$x_i$ | +$x_k$ | i > k |
| T2 | ±$x_i$ | −$x_k$ | i > k |
| T3 | −$x_i$ | +$x_i$ | Same dimension neg-pos signs |
|  | +$x_i$ | −$x_i$ | Same dimension pos-neg signs |

VL modification rules, for turn types T0, T1, T2 and T3 are given in Table 7, which replaces Table 4 above.

TABLE 7

Rules applied by switches for conditionally modifying
VLs of received packets to prevent deadlocks

| Rule for VL modification | Type of turn created by switch | Ingress VL | Egress VL |
|---|---|---|---|
| Rule1 | T0 | VL | VL |
| Rule2 | T1 | VL odd | VL + 1 |
|  |  | VL even | VL |
| Rule3 | T2 | VL even | VL + 1 |
|  |  | VL odd | VL |
| Rule4 | T3 | VL | VL + 1 |

In this embodiment, the packets have a field in the packet header for marking the packet as "VL increased." By default, the "VL increased" field of the packets is unmarked. When identifying that the input hop and output hop of a packet traverse the same dimension and have opposite signs, and that the VL increased field is unmarked, the switch increases the packet VL by one, and marks the packet as "VL increased."

When identifying that the input hop and output hop of a packet traverse the same dimension and have opposite signs, and the "VL increased" field of the packet is marked, the switch forwards the packet without increasing the packet's VL and unmarking the "VL increased" field of the packets. In all other cases e.g., when traversing between different dimensions or traversing along the same dimension with the same hop sign, the "VL increased" field of the packets is unmarked. In a system that supports marking packets with a "VL increased" mark, the methods described above for selecting routes in a torus Cartesian topology, are modified so that traversing two consecutive turns of type T3 on same dimension increases the number of VLs required by one (and not by two). The method for finding routes having a minimal number of VLs required, as described above, should use Table 8 below in order to calculate the route attribute inc(s'→t), instead of using Table 5 above.

TABLE 8

Optimized calculation of inc(s'→t) based
on turnType(s'→t) and t.turnType

| turnType(s'→t)/ t.turnType | T0 | T1 | T2 | T3 |
|---|---|---|---|---|
| T0 | t.inc | t.inc | t.inc + 1 | Vl_inc = 1 and inc(s'→t) = t.inc + Vl_inc |
| T1 | t.inc | t.inc | t.inc + 2 | Vl_inc = 2 and inc(s'→t) = t.inc + Vl_inc |
| T2 | t.inc | t.inc | t.inc | Vl_inc = 0 and inc(s'→t) = t.inc + Vl_inc |
| T3 | t.inc | t.inc | Vl_inc = F_inc(Vl_inc) and inc(s'→t) = t.inc + Vl_inc | * optimized inc(s'→t) calculation |

In Table 8, when turnType(s'→t)==T2 and t.turn-Type==T3, VL_inc is calculated using the following function: Y=F_inc(Vl_inc), wherein if (Vl_inc==0) then Y=2, else if (Vl_inc==1) then Y=1, else Y=0.

In Table 8, when turnType(s'→t)==T3 and t.turn-Type==T3, VL_inc is calculated using the following optimized calculation:

If [t.hopDim==dim(s'→t)] and [t.sign!=sign(s'→t)] then inc(s'→t)=t.inc, else Vl_inc=F_inc(Vl_inc) and inc(s'→t)= t.inc+Vl_inc.

VL Management

As described above, network manager 36 selects for some or all pairs of source and destination switches in network 30 a respective shortest-path route that requires the minimal number of virtual buffers (or VLs) among the examined candidate routes.

Note that in implementing the method of FIG. 4, selecting preferred routes from among the candidate routes is constrained by a VL budget predefined by the processor, the VL budget specifies the maximal number of VL available in the switch for a single QoS level. For static routing, the worst-case route in the network, in terms of the number of VL required, should satisfy the VL budget.

In adaptive routing, the network switches are configured to route a packet received in a given ingress interface to one of several predefined egress interfaces. The selection of the egress interface is done locally within the switch. In configuring adaptive routing, any route for which increasing the VL by the switch does not exceed the VL budget can be selected. Methods for building adaptive routing rules by finding two or more routes from a source switch to a destination switch were described above.

In some embodiments, to design routing rules that support adaptive routing, the network manager first defines static routes having the minimal number of VLs required, as described above, and then defines adaptive routing rules for the switches based on information collected in defining the static routes.

In designing the adaptive routing rules for meeting the VL budget, in some embodiments, the network manager considers the following factors: (i) the packet's ingress interface (incoming hop dimension) and (ii) the packet's ingress VL value. Using these two factors, the network manager can calculate the minimal VL increase required for multiple alternative paths traversing through every respective neighbor switch. Note that by using the above design, a switch may have a different adaptive routing table for each combination of incoming dimension and ingress VL. Since the storage space required for storing these routing tables is a limited and expensive resource, in some embodiments, a highest incoming dimension is assumed, and adaptive routing tables are stored in the switch only for each incoming VL modulo the VL budget. Note that the overall number of VLs supported may be higher than the VL budget, e.g., when the VL budget is used for multiple Qos levels, as described above. With this optimization (of assuming the highest incoming dimension) the total number of adaptive routing tables needed is equal to the VL budget.

In some embodiments, the definition of the turn types T0, T1 and T2 can take a simpler form, for example, when the underlying topology is non-cyclic. In some embodiments, events of fully crossing the topology edges in a cyclic Cartesian topology can be handled explicitly, e.g., by defining a suitable turn type, and modifying the VL modification rules in Table 4, accordingly.

Although the embodiments described herein mainly address Cartesian topologies, the methods and systems described herein can also be used in other applications, such as for preventing deadlocks in networks configured to other types of topologies, e.g., the Dragonfly topology, by defining suitable turn types and related VL modification rules.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

APPENDIX

The appendix provides a proof that a round route in a Cartesian topology contains at least one turn of type T1 and one turn of type T2.

A route in a Cartesian topology can be specified as a sequence of hops $(-1)^{\in_1} x_{i_1}, \ldots, (-1)^{\in_k} x_{i_k}$, wherein the hop at time index 't' traverses a dimension $i_t$ and has a sign attribute $(-1)^{\in_t}, \in_t \in \{0,1\}$. Since a round route returns to its starting point, for each hop $x_i$ the round route must also have a hop $-x_i$. Note that a torus topology additionally supports a round route along one dimension. Such a route contains multiple hops $x_i$ (or $-x_i$) as size of the topology in that dimension, and one hop $-x_i$ (or $x_i$).

Let $x_m$ denote a hop in the round route that traverses the lowest dimension in that route, and without loss of generality assume that $x_m$ is not the first hop. The first occurrence of $x_m$ in the sequence of hops must have a pattern of the form $\pm x_i, x_m$ wherein i>m, or a pattern of the form $-x_m, x_m$ (in a cyclic topology), which are the patterns defining a turn of type T1. Similarly, the first occurrence of the hop $-x_m$ has a pattern of the form $\pm x_i, -x_m$ wherein i>m, or a pattern of the form $x_m, -x_m$ (in a cyclic topology), which are the patterns defining a turn of type T2.

The proof given above applies to Cartesian topologies such as mesh, torus, hypercube, and generalized hypercube.

The invention claimed is:

1. An apparatus, comprising:
   a network interface, configured to communicate with a network that comprises a plurality of switches interconnected in a Cartesian topology having multiple dimensions; and
   a processor, configured to:
      predefine multiple turn types of turns in the Cartesian topology, wherein each turn traverses a first hop successively followed by a second hop, wherein each turn type is defined at least by identities of first and second dimensions traversed respectively in the first and in the second hops;
      search for one or more preferred routes via the network from a source switch to a destination switch, by evaluating candidate routes based at least on a number of Virtual Lanes (VLs) required for preventing a deadlock condition caused by a candidate route, wherein the number of VLs required depends on an ordered sequence of the turn types of the turns formed by a sequence of hops comprising the candidate route; and
      configure one or more of the switches in the network to route packets from the source switch to the destination switch along one or more of the preferred routes,
      wherein the processor is configured to evaluate the candidate route by concatenating to the candidate route multiple different candidate hops to produce multiple respective extended candidate routes, and selecting an extended candidate route satisfying a predefined route selection criterion, and to evaluate the number of VLs required depending on (i) a turn type of a turn created by a candidate hop followed by an initial hop of the candidate route, and (ii) the ordered sequence of turn types in the candidate route prior to concatenating the candidate hop.

2. The apparatus according to claim 1, wherein the route selection criterion comprises one or more of (i) selecting a shortest-path route among the extended candidate routes, (ii) selecting an extended candidate route having a minimal number of VLs required among the extended candidate routes, and (iii) selecting an extended candidate route for which the number of VLs required meets a predefined VL budget.

3. The apparatus according to claim 1, wherein the processor is configured to predefine an order among identities of the dimensions of the Cartesian topology, and to predefine the turn types by defining:
   (i) a T0 turn type, for which the second dimension is higher in the order than the first dimension, or the second dimension equals the first dimension and the first and second hops have a same sign, wherein a sign of a given hop is positive or negative depending on whether the given hop traverses to a switch having a respective higher or lower coordinate value in the dimension of the given hop,
   (ii) a T1 turn type, for which the second dimension is lower in the order than the first dimension and the sign of the second hop is positive, or the second dimension equals the first dimension, the sign of the first hop is negative, and the sign of the second hop is positive, and
   (iii) a T2 turn type, for which the second dimension is lower in the order than the first dimension and the sign of the second hop is negative, or the second dimension equals the first dimension, the sign of the first hop is positive, and the sign of the second hop is negative.

4. The apparatus according to claim 3, wherein the switches are interconnected in a pristine torus topology, wherein the processor is configured to search for the preferred routes by evaluating candidate routes comprising one or more of the turn types T0, T1 and T2, and wherein regardless of a number of dimensions comprising the pristine torus topology, a preferred route in the pristine torus topology requires a VL budget of up to three VLs, to prevent a deadlock condition.

5. The apparatus according to claim 1, wherein the processor is configured to configure the switches to re-associate a packet received by traversing a given hop and that is associated with a given VL, with a VL value that depends on (i) the given VL and (ii) a turn type of a turn created by the given hop followed by a next hop to which the packet is forwarded.

6. The apparatus according to claim 1, wherein the processor is configured to define adaptive routing rules for the switches by defining for a given ingress interface of the source switch at least two egress interfaces for routing packets from the source switch to the destination switch without exceeding a predefined VL budget, and to configure the switches to apply adaptive routing from the source switch to the destination switch using the at least two egress interfaces.

7. The apparatus according to claim 1, wherein the processor is configured to build adaptive routing rules for routing from a source switch to a destination switch, by finding two or more routes from the source switch to the destination switch, each route meets a predefined VL budget, and calculating the number of the VLs required by each route based on the turn type of the turn traversing from the source switch to a selected neighbor switch of the source switch, and on a precalculated route having a minimal number of VLs required for traversing from the selected neighbor switch to the destination switch.

8. The apparatus according to claim 1, wherein the processor is configured to search for the preferred routes while refraining from evaluating candidate routes in which at least one of the switches, or a physical link connecting two of the switches, is missing from the Cartesian topology or malfunctions.

9. The apparatus according to claim 1, wherein the processor is configured to search for a single preferred route via the network from the source switch to the destination switch.

10. A method, comprising:
in a processor communicating with a network that comprises a plurality of switches interconnected in a Cartesian topology having multiple dimensions, predefining multiple turn types of turns in the Cartesian topology, wherein each turn traverses a first hop successively followed by a second hop, wherein each turn type is defined at least by identities of first and second dimensions traversed respectively in the first and in the second hops;
searching for one or more preferred routes via the network from a source switch to a destination switch, by evaluating candidate routes based at least on a number of Virtual Lanes (VLs) required for preventing a deadlock condition caused by a candidate route, wherein the number of VLs required depends on an ordered sequence of the turn types of the turns formed by a sequence of hops comprising the candidate route; and
configuring one or more of the switches in the network to route packets from the source switch to the destination switch along one or more of the preferred routes,
wherein evaluating the candidate route comprises concatenating to the candidate route multiple different candidate hops to produce multiple respective extended candidate routes, and selecting an extended candidate route satisfying a predefined route selection criterion, and wherein evaluating the number of VLs required is dependent on (i) a turn type of a turn created by a candidate hop followed by an initial hop of the candidate route, and (ii) the ordered sequence of turn types in the candidate route prior to concatenating the candidate hop.

11. The method according to claim 10, wherein the route selection criterion comprises one or more of (i) selecting a shortest-path route among the extended candidate routes, (ii) selecting an extended candidate route having a minimal number of VLs required among the extended candidate routes, and (iii) selecting an extended candidate route for which the number of VLs required meets a predefined VL budget.

12. The method according to claim 10, and comprising predefining an order among identities of the dimensions of the Cartesian topology, wherein predefining the turn types comprises defining:
  (i) a T0 turn type, for which the second dimension is higher in the order than the first dimension, or the second dimension equals the first dimension and the first and second hops have a same sign, wherein a sign of a given hop is positive or negative depending on whether the given hop traverses to a switch having a respective higher or lower coordinate value in the dimension of the given hop,
  (ii) a T1 turn type, for which the second dimension is lower in the order than the first dimension and the sign of the second hop is positive, or the second dimension equals the first dimension, the sign of the first hop is negative, and the sign of the second hop is positive, and
  (iii) a T2 turn type, for which the second dimension is lower in the order than the first dimension and the sign of the second hop is negative, or the second dimension equals the first dimension, the sign of the first hop is positive, and the sign of the second hop is negative.

13. The method according to claim 12, wherein the switches are interconnected in a pristine torus topology, wherein searching for the preferred routes comprises evaluating candidate routes comprising one or more of the turn types T0, T1 and T2, and wherein regardless of a number of dimensions comprising the pristine torus topology, a preferred route in the pristine torus topology requires a VL budget of up to three VLs to prevent a deadlock condition.

14. The method according to claim 10, wherein configuring the switches comprises configuring the switches to re-associate a packet received by traversing a given hop and that is associated with a given VL, with a VL value that depends on (i) the given VL and (ii) a turn type of a turn created by the given hop followed by a next hop to which the packet is forwarded.

15. The method according to claim 10, and comprising defining adaptive routing rules for the switches by defining for a given ingress interface of the source switch at least two egress interfaces for routing packets from the source switch to the destination switch without exceeding a predefined VL budget, and wherein configuring the switches comprises configuring the switches to apply adaptive routing from the source switch to the destination switch using the at least two egress interfaces.

16. The method according to claim 10, and comprising building adaptive routing rules for routing from a source switch to a destination switch, by finding two or more routes from the source switch to the destination switch, each route meets a predefined VL budget, and calculating the number of the VLs required by each route based on the turn type of the turn traversing from the source switch to a selected neighbor switch of the source switch, and on a precalculated route having a minimal number of VLs required for traversing from the selected neighbor switch to the destination switch.

17. The method according to claim 10, wherein searching for the preferred routes comprises searching for the preferred routes while refraining from evaluating candidate routes in which at least one of the switches, or a physical link connecting two of the switches, is missing from the Cartesian topology or malfunctions.

18. The method according to claim 10, wherein searching for the one or more preferred routes comprises searching for a single route via the network from the source switch to the destination switch.

\* \* \* \* \*